United States Patent [19]

Weible et al.

[11] Patent Number: 4,650,045

[45] Date of Patent: Mar. 17, 1987

[54] METHOD AND APPARATUS FOR CONTROLLING THE OUTPUT SPEED OF A FLUID FRICTION CLUTCH

[75] Inventors: Reinhold Weible, Stuttgart; Karl Lochmahr, Vaihingen, both of Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 649,611

[22] Filed: Sep. 12, 1984

[30] Foreign Application Priority Data

Sep. 15, 1983 [DE] Fed. Rep. of Germany ....... 3333268

[51] Int. Cl.⁴ .............................................. F16D 35/00
[52] U.S. Cl. .............................. 192/0.02 R; 192/58 B; 192/82 T; 192/103 F
[58] Field of Search .............. 192/0.02 R, 58 B, 82 T, 192/103 F; 251/129.11

[56] References Cited

U.S. PATENT DOCUMENTS

| | | | |
|---|---|---|---|
| 3,823,621 | 7/1974 | Kubo et al. | 192/103 F X |
| 3,990,556 | 11/1976 | Hayashi et al. | 192/58 B |
| 4,228,880 | 10/1980 | Gee | 192/58 B |
| 4,270,641 | 6/1981 | Nonnenmann et al. | 192/58 B X |
| 4,305,491 | 12/1981 | Rohrer | 192/82 T X |
| 4,310,084 | 1/1982 | Nonnenmann | 192/58 B |
| 4,310,085 | 1/1982 | LaFlame | 192/58 B |
| 4,356,900 | 11/1982 | Sommer | 192/0.02 R |
| 4,432,444 | 2/1984 | Hauser | 192/58 B |
| 4,488,628 | 12/1984 | Kluna et al. | 192/58 B |
| 4,499,920 | 2/1985 | Steffan et al. | 251/133 X |

FOREIGN PATENT DOCUMENTS

| | | |
|---|---|---|
| 2728901 | 1/1978 | Fed. Rep. of Germany . |
| 2804859 | 8/1979 | Fed. Rep. of Germany . |
| 3029992 | 3/1982 | Fed. Rep. of Germany . |
| 2059021 | 4/1981 | United Kingdom ............. 192/82 T |

*Primary Examiner*—Rodney H. Bonck
*Assistant Examiner*—Richard M. Lorence
*Attorney, Agent, or Firm*—Schwartz, Jeffery, Schwaab, Mack, Blumenthal & Evans

[57] ABSTRACT

Disclosed is a method and apparatus for controlling the output speed of a fluid friction clutch. The fluid friction clutch comprises a work chamber, in which a drive disk rotates, and a reservoir. A valve controls the circulation of a viscous medium between the work chamber and the reservoir. The output rotational speed is thus dependent on the filling ratio of the work chamber. The valve is actuated as a function of at least one control parameter by means of a stepping motor connected with the clutch. The control parameter is preferably the temperature of the cooling medium of an internal combustion engine. The rotational output of the stepping motor is converted to a linear motion to actuate the valve lever by means of a spindle drive.

19 Claims, 2 Drawing Figures

METHOD AND APPARATUS FOR CONTROLLING THE OUTPUT SPEED OF A FLUID FRICTION CLUTCH

BACKGROUND OF THE INVENTION

The present invention relates to a method for controlling the output speed of a fluid friction clutch by regulating the filling ratio by means of a valve located between the work chamber and the reservoir. The invention furthermore pertains to an apparatus for carrying out said process, i.e., a fluid friction clutch having a work chamber and a reservoir, separated by a partition in which a valve actuated by a valve lever is located for regulation of the filling ratio.

Such fluid friction clutches are known, for example, from German Offenlegungsschrift No. 28 04 557 or German Offenlegungsschrift No. 28 04 859.

In the fluid friction clutch according to German Offenlegungsschrift No. 28 04 859, the valve lever of the fluid friction clutch is actuated by means of an electromagnet activated as a function of the temperature of the cooling medium. This so-called two-position control (on/off switch) operates in a relatively coarse manner and does not allow, without further assistance, the maintenance of stable intermediate speeds between the minimum and maximum output speeds.

In the fluid friction clutch according to German Offenlegungsschrift No. 28 04 557, the valve lever is actuated by means of a heated expansion element, which is also activated as a function of the cooling medium temperature. Activation by means of an expansion element has the disadvantage, in relation to the control of the output speed of a fluid friction clutch, that the cooling of the expansion element depends on different environmental conditions and therefore takes place in a relatively uncontrolled manner. The control process is thus relatively sluggish, possibly resulting in a delayed clutch response.

A fluid friction clutch is known from European Pat. No. 9415, wherein the valve lever is actuated electromagnetically via the drive shaft, and regulated continuously between an open and a closed position in a cyclical manner. The disadvantage in this so-called cycling process is that a high activating power is required as a consequence of the rapid valve actuation.

Because of the large number of switching cycles, there is the further disadvantage that the cyclically regulated parts of the valve mechanism are exposed to greater mechanical wear, which has a negative effect on the life of these structural elements and thus on that of the clutch.

Finally, German Offenlegungsschrift No. 27 28 901 discloses a method to limit the rotational speed of a fan driven by such a clutch, wherein the clutch is a hydrodynamic clutch with filling ratio regulation. This regulation is effected by means of a clutch control which regulates an additional fluid circuit drive by a pump, with regulation in the clutch control taking place by means of an electromagnetically actuated valve. Such clutches and clutch controls are technically complicated and costly.

SUMMARY OF THE INVENTION

It is therefore an object of the present invention to provide a method for controlling the output speed of a fluid friction clutch of the above-mentioned type. This method should function as reliably as possible and relatively without inertia, while allowing a defined dependence of the output speed on a control parameter, particularly a defined dependence of the rotational speed of the fan on the cooling medium temperature of an internal combustion engine in an automotive vehicle.

It is a further object of the present invention to provide an apparatus for carrying out the foregoing process, which is simple in its configuration, reliable in operation, cost effective to manufacture and easily incorporated into fluid friction clutches, particularly in automotive vehicles.

In accomplishing the foregoing objects, there has been provided in accordance with one aspect of the present invention a method for controlling output speed of a fluid friction clutch of the type having a work chamber and a reservoir, by controlling the filling ratio of the two chambers, comprising the steps of allowing fluid to pass between the two chambers by means of a valve, positioning the valve by means of a stepping motor actuator, and controlling the stepping motor actuator as a function of at least a first control parameter. Preferably, the controlling step comprises feeding at least a first control parameter to a controller unit, generating a control signal in the controller unit and transmitting the control signal to the stepping motor. Typically, the method further comprises feeding a second control parameter to the controller unit.

In a preferred embodiment, the fluid friction clutch is operatively connected to an automotive vehicle fan, whereby the method further comprises providing a flow of cooling air by means of the fan driven by the fluid friction clutch and directing the flow of cooling air onto a radiator through which the cooling medium of the internal combustion engine flows. Usually, the first control parameter is a function of the temperature of the cooling medium.

In accordance with another aspect of the invention, there has been provided an apparatus for controlling the output speed of a fluid friction clutch of the type having a work chamber and a reservoir separated by a partition which contains a flow orifice for a viscous working fluid, and a valve positioned in the orifice to control the filling ratio of working fluid in the work chamber, this apparatus comprising a stepping motor actuator, means for connecting the stepping motor actuator to the fluid friction clutch, preferably coaxially with the clutch, means for transmitting the output of the stepping motor actuator to control the position of the valve, and means for operating the stepping motor actuator in response to at least one measured control parameter of the fluid friction clutch.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
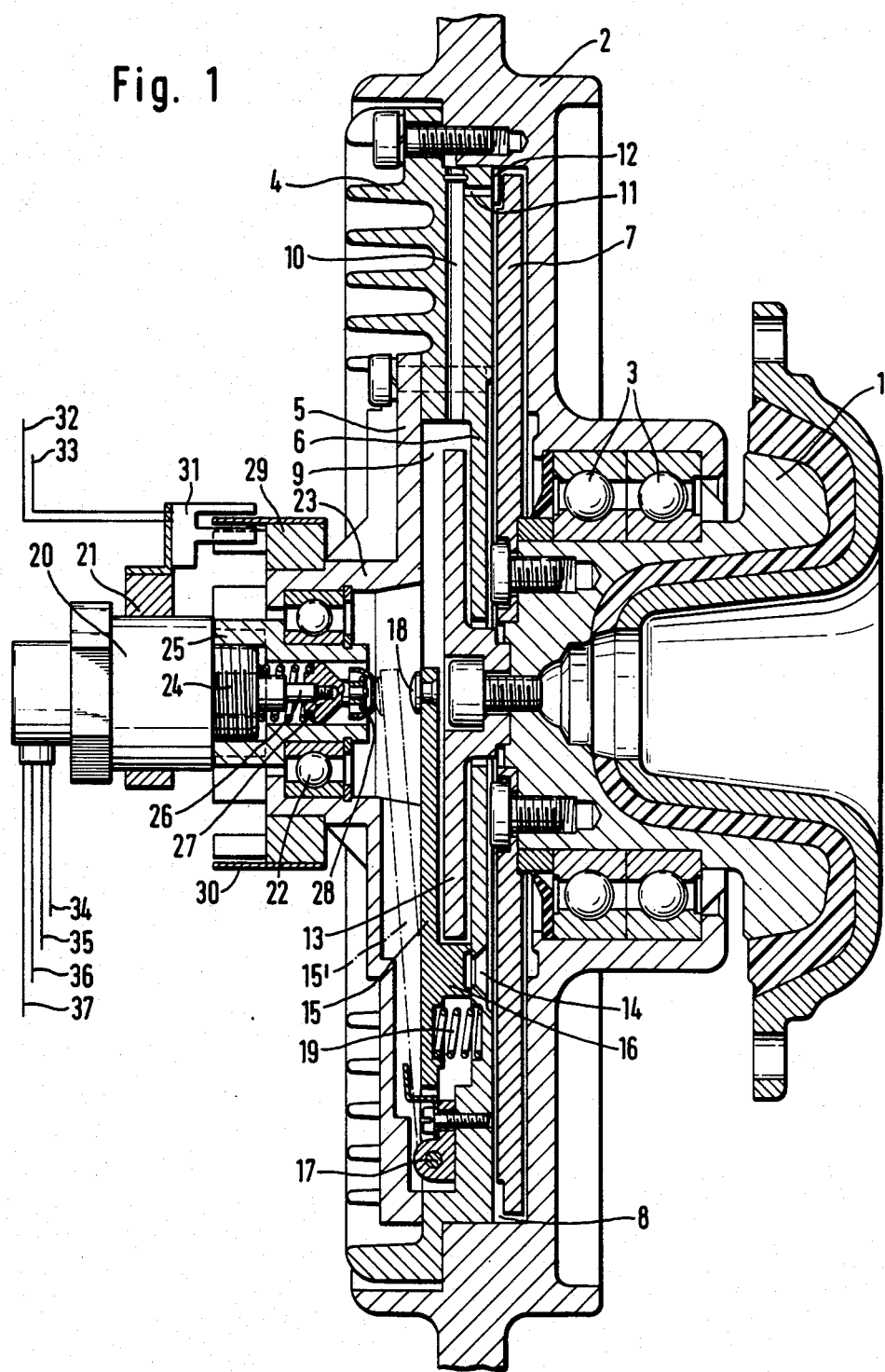
FIG. 1 is a cross-sectional view through the fluid friction drive equipped with a stepping motor actuator according to the invention.

According to the invention, the valve of the fluid friction clutch is actuated by means of a stepping motor actuator as a function of at least one control parameter. It is thereby possible to obtain a quasi-constant (analog) control of the output speed by means of a sturdy, digital controlled actuator, and to protect the parts of the valve mechanism of the clutch against excessive wear.

According to a further embodiment of the present invention, the control parameter is communicated to the stepping motor actuator through a regulator, i.e., an integrated control circuit or a microcomputer. In this manner, a defined dependence is obtained between the stroke of the stepping motor and the control parameter. It is thus possible to adapt the cooling or fan output to the instantaneous cooling requirements of the internal combustion engine. In another embodiment of the present invention, the output rotational speed of the fluid friction clutch is employed as an auxiliary control parameter. In this manner, under certain operating conditions, the rotational speed of the fan may be limited to a maximum value, which, among other things, would reduce the noise of the fan.

In another embodiment of the present invention, the output rotational speed may be determined by a so-called Hall probe, which makes it possible to convert the rotational speed into voltage pulses.

In an advantageous further embodiment of the present invention, the stepping motor actuator, which itself comprises a step-wise rotating motor shaft, produces a linear motion transmitting to the valve lever. This allows the stepping motor to be easily intalled in a known fluid friction clutch with valve control. The valve lever may, depending on the configuration of the stepping motor, have an arbitrary number of intermediate settings between "fully closed" and "fully open", as with analog controls. In this manner, the flow of a viscous fluid may be controlled as desired, while the corresponding intermediate output speeds may be maintained stable.

In another embodiment of the present invention, the temperature of the circulating cooling medium of an internal combustion engine in an automotive vehicle is regulated. In this way, the controller may be provided with an input of additional load variables, assessed according to their effect, in addition to the cooling medium temperature as the control parameter and the rotational speed of the fan as the auxiliary control parameter. The process according to the invention for regulating the output speed of a fluid friction clutch is thus especially appropriate for use in automotive vehicles, wherein the exchange of heat between the cooling air and the cooling medium in the radiator is controlled by means of a fan.

In an advantageous further aspect of the present invention, an apparatus for carrying out the process is disclosed. According to this aspet, the stepping motor actuator is arranged coaxially in the cover of the fluid friction clutch and activates the valve lever of the clutch. The stepping motor actuator is supported rotatably in the clutch, but is otherwise stationary (in the vehicle, for example,) so that a fixed cable connection is feasible. A further advantage of this drive is that the motor, which itself rotates in steps, produces a linear motion by means of an activating element comprising a nut/spindle drive. This makes a simple transmission of the motion to the valve lever of the clutch possible. Furthermore, the transmission of rotary to axial movement by the threaded drive arrangement allows the valve lever to be accurately set in numerous intermediate positions. As a result of the stationary support of the actuator, the rotational speed counter, a so-called Hall probe, may be structurally integrated, in a simple manner, with the actuator and the clutch. It is further advantageous to equip the clutch with an accessory disk revolving in the reservoir. This improves the flow of oil to the valve bore, in a manner known from German Pat. No. 30 29 992 (which is equivalent to U.S. patent application Ser. No. 290,058, herein incorporated by reference), and stabilizes the intermediate rotational speed. Finally, it is advantageous that the valve lever be biased by an opening spring, so that in case of failure of the auxiliary power for the stepping motor actuator, the valve lever is deflected into its "fully open" position, whereby the clutch is fully engaged. Overheating of the engine in an automotive vehicle is thus prevented in case of such an occurrence.

With reference now to the drawings, FIG. 1 shows a fluid friction clutch which is driven by the internal combustion engine of an automotive vehicle and carries a fan which directs cooling air through the radiator of the internal combustion engine. On the drive shaft 1 of the fluid friction clutch, the clutch housing 2 is supported rotatably by means of the double bearing 3. The housing is closed on its frontal side by a housing cover 4 and a bearing shield 5. The clutch is divided into a work chamber 8 and a reservoir 9, by a partition 6, which is a component of the cover 4. The primary disk 7, connected with the drive shaft 1, rotates in the work chamber 8. The accessory disk 13, also connected with the drive shaft 1, rotates in the reservoir 9. Such a clutch is known from commonly assigned German Pat. No. 30 29 992. Reservoir 8 contains a viscous fluid, which, in case of a rotational speed differential between the primary disk 7 and the clutch housing 2, is returned into the reservoir 9 through the baffle 12, the axial return bore 11 and the radial return bore 10. From the reservoir, the viscous fluid again returns to work chamber 8 through the valve bore or flow orifice 14 in the partition 6, depending on the setting of the valve lever 15. The filling ratio of the work chamber 8 is regulated in this manner, and the degree of filling in turn determines the transmittable torque. The valve lever 15 is supported by means of a journal 17 on the housing cover 4 and has at its other end a contact rivet 18, arranged approximately in the area of the axis of rotation of the clutch. The valve lever 15 is further equipped with a valve closing element 16 in the area adjacent to the valve opening 14, which either closes the valve opening 14 or opens in a continuously variable manner up to a maximum displacement. The opening is effected by the force of the opening spring 19. The position of the valve lever 15, indicated by the solid lines in the drawing, represents the closed position in which no viscous fluid may pass through the valve opening 14; the position of the valve lever 15' indicated by the phantom line is the maximum opening, in which the flow cross section is at a maximum.

On the frontal side of the clutch, a bearing shield 5 is set into the housing cover, which serves as a mount and carries the stepping motor activator by means of a neck 23, a deep groove ball (rotating) bearing 22 and a bearing sleeve 25. The stepping motor actuator 20 is thus rotatably supported with rspect to the clutch housing 2, while being held immobile by means of the stationary bearing ring 21. This constitutes the means for connecting the stepping motor actuator to the clutch.

The bearing sleeve 25 and the stepping motor actuator 20 are joined together by a thread 24 in both parts. The stepping motor actuator 20 is a known, commercially available electromechanical subassembly, which may be purchased, from the Philips GmbH Co., Hamburg (Valvo Department) or the Delco Co. for example. The stepping motor actuator 20 is equipped inside with a motor shaft (not shown here) revolving in steps and driving a spindle nut, which in turn imparts a step-wise linear motion to the spindle 26. For guidance and support, a head piece 27 is arranged on the outer end of the spindle 26. The head piece 27 slides in the bearing sleeve 25 and carries a rotary plate 28 on its outer end, which is in contact with the contact rivet 18 of the valve lever 15. This is the means for transmitting the output of the stepping motor actuator to control the position of the valve.

To detect the output speed of the clutch, i.e., the rotational speed of the fan, a ring 29 is mounted on the neck 23, this ring 29 carrying a crown-shaped soft iron diaphragm 30 to serve as a rotational speed transducer. A so-called Hall probe 31 is fastened to the stationary bearing 21, and this probe is operatively associated with the rotating, crown-shaped diaphragm 30, thereby detecting the output rotational speed and transmitting it as a signal potential through the connecting wires 32, 33.

The steping motor actuator 20 has two magnetic windings inside which are supplied with power and actuated by means of the connecting cables 34, 35, 36 and 37. The stepping motor thus receives control pulses from an appropriate control circuit, and it converts these pulses into a step-wise linear motion used to position the valve lever.

Figure 2:
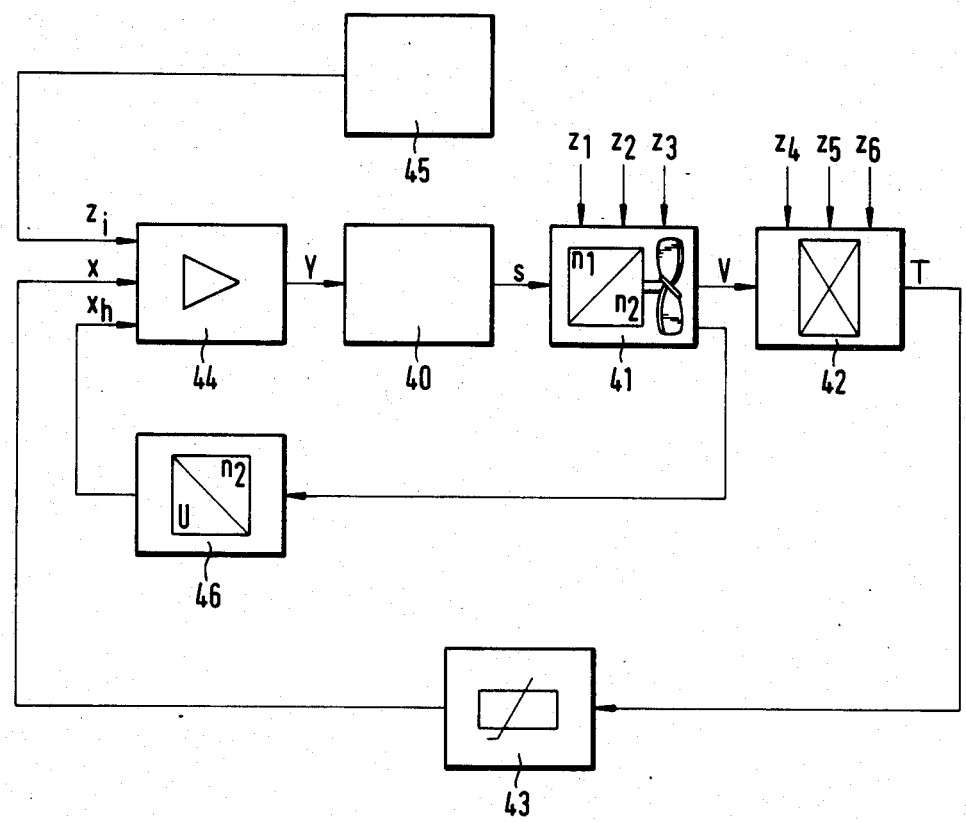
FIG. 2 is a block diagram of the control circuit with the fluid friction clutch controlled by the stepping motor for the cooling medium circulation of an internal combustion engine.

FIG. 2 shows a block diagram for the control circuit, in which the aforedescribed fluid friction clutch is installed to drive a fan. Among the individual components of the control circuit is, firstly, the stepping motor atuator 40 producing a displacement s and transmitting this displacement to the clutch fan unit 41. The clutch is driven by the internal combustion engine of an automotive vehicle with a rotational speed of $n_1$ and in turn generates an output rotational speed of $n_2$ equal to the rotational speed of the fan. The fan produces a flow of cooling air with a flow rate V impacting the radiator 42, through which the cooling medium of the internal combustion engine flows. In the radiator 42, the cooling medium transfers its heat to the air flow V and leaves the radiator at a temperature T, which is measured in the cooling temperature transducer 43 and transmitted as control parameter x to the controller unit 44. The controller unit 44, an integrated control circuit or a microcomputer, produces an output signal Y in the form of control pulses, which are communicated to the stepping motor, thereby controlling its movements. To improve the control function, the rotational speed of the fan $n_2$ is measured by a rotational speed counter 46 (Hall probe) and is again communicated to the controller unit 44 as an auxiliary control parameter $x_h$. The control circuit is, in actuality, i.e., in a moving automotive vehicle, affected by numerous load values $z_i$. Thus, the fan clutch unit 41 is affected by the load values $z_1$, $z_2$ and $z_3$, which may originate, for example, in the drive rotational speed $n_1$ of the clutch, the temperature of the environment of the clutch or the dynamic pressure of the moving vehicle. For the radiator, the load values $z_4$, $z_5$ and $z_6$ may be generated, for example, by the temperature of the cooling air, the temperature of the cooling medium in the reservoir or the flow rate of the cooling medium through the radiator. These load values $z_i$ are measured and transmitted to a switching unit 45, which in turn may be a part of the controller unit 44. In the switching unit 45 the load values $z_i$ are evaluated statically or possibly dynamically according to their effect on the control parameter, and communicated to the controller unit 44. This represents one embodiment of the means for operating the stepping motor actuator in response to one or more measured control parameters.

In the aforedescribed embodiment, the cooling medium temperature in the radiator reflux was employed as the control parameter x; in automotive vehicles, a commonly used temperature transducer may be used for this purpose. It is also possible to measure the temperature of the cooling medium in the reservoir, or to use the temperature of the engine oil as the control parameter.

What is claimed is:

1. A method for controlling output speed of a fluid friction clutch of the type having a reservoir for holding a viscous working fluid and a work chamber for receiving an amount of working fluid from the reservoir, by controlling the amount of working fluid contained in the work chamber, comprising the steps of:
    allowing working fluid to pass between the reservoir and the work chamber by means of a valve;
    positioning said valve between an open and a closed position through a plurality of intermediate partially open positions by means of a stepping motor actuator;
    measuring a first control parameter associated with the operation of the clutch; and
    controlling said stepping motor actuator as a function of at least said first control parameter, to position and maintain said valve in at least one of said partially open positions desired in response to said first control parameter.

2. A method according to claim 1, wherein said controlling step comprises feeding at least a first control parameter to a controller unit, generating a control signal in said controller unit and transmitting said control signal to said stepping motor.

3. A method according to claim 2, further comprising measuring a second control parameter associated with the operation of the clutch and feeding said second control parameter to said controller unit.

4. A method according to claim 3, further comprising the step of limiting output rotational speed of the fluid friction clutch to a maximum value.

5. A method according to claim 4, further comprising the step of measuring output rotational speed of the clutch and converting said rotational speed to electrical impulses.

6. A method according to claim 5, wherein said second control parameter is the output speed converted to electrical impulses.

7. A method according to claim 1, wherein said positioning step comprises transforming rotational movement of the stepping motor into linear motion and transmitting said linear motion from the stepping motor actuator to the valve.

8. A method according to claim 1, further comprising providing a flow of cooling air by means of a fan drive by the fluid friction clutch, and directing said flow of cooling air onto a radiator through which a cooling medium of an internal combustion engine flows, wherein said first control parameter is a function of the temperature of the cooling medium.

9. A method according to claim 1, wherein said positioning step comprises positioning the valve through a continuously variable number of intermediate positions.

10. A process according to claim 3, further comprising the step of feeding to said controller unit at least a third control parameter in addition to said first control parameter and said second control parameter, said third control parameter comprising a load value on said fluid friction clutch.

11. An apparatus for controlling the output speed of a fluid friction clutch of the type having a work chamber for receiving an amount of a viscous working fluid and a reservoir separated by a partition which contains a flow orifice for the viscous working fluid, and a valve positioned to selectively open and close the orifice to control the amount of working fluid in the work chamber, said apparatus comprising:

a stepping motor actuator;

means for connecting said stepping motor actuator to the fluid friction clutch;

means for transmitting the output of said stepping motor actuator to control the position of the valve between an open and a closed position through a plurality of intermediate partially open positions; and means for operating said stepping motor actuator in response to at least one measured control parameter of the fluid friction clutch to position and maintain the valve in at least one of said partially open positions desired in response to the at least one measured control parameter.

12. An apparatus according to claim 11, wherein said transmitting means comprises a valve lever for actuating said valve, and an activating element joining the stepping motor actuator and the valve lever.

13. An apparatus according to claim 12, wherein said connecting means comprises a mount for mounting said apparatus coaxially with the fluid friction clutch.

14. An apparatus according to claim 13, wherein the connecting means further comprises a cover on the frontal side of the fluid friction clutch, a rotating bearing arranged in the cover, and a stationary bearing arranged adjacent the cover, which, in conjunction with said rotating bearing, functions to support the stepping motor actuator.

15. An apparatus according to claim 14, wherein said activating element comprises an axially movable spindle having a first end connected with the stepping motor actuator and a second end in contact with the valve lever.

16. An apparatus according to claim 15, further comprising:

a rotational speed transducer located on the cover; and a rotational speed detector located on the stationary bearing of the stepping motor actuator.

17. An apparatus according to claim 11, wherein said fluid friction clutch further comprises:

a primary disk rotating in the work chamber and connected with the drive shaft; and an accessory disk rotating in the reservoir, in rotation with and connected fixedly to the drive shaft.

18. An apparatus according to claim 12, wherein the valve lever is biased open by means of an opening spring.

19. A combination, comprising a fluid friction clutch and an apparatus as defined by claim 11.

* * * * *